(12) United States Patent
Salamon

(10) Patent No.: US 6,395,349 B1
(45) Date of Patent: May 28, 2002

(54) METHOD OF MARKING DISKS

(75) Inventor: David Vigdor Salamon, San Jose, CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 09/318,241

(22) Filed: May 25, 1999

(51) Int. Cl.[7] .............................. C08J 7/18; B05D 5/12
(52) U.S. Cl. ...................... 427/555; 427/130; 427/131; 427/132; 427/257; 427/264; 427/265; 427/276
(58) Field of Search ................................ 427/130, 131, 427/132, 555, 248.1, 209, 264, 265, 276, 372.2, 402, 257

(56) References Cited

U.S. PATENT DOCUMENTS

| | | | |
|---|---|---|---|
| 5,108,781 A | * 4/1992 | Ranjan et al. ............. | 427/53.1 |
| 5,567,484 A | 10/1996 | Baumgart et al. .......... | 427/555 |
| 5,586,040 A | 12/1996 | Baumgart et al. ..... | 364/474.08 |
| 5,861,196 A | 1/1999 | Kuo et al. .................. | 427/555 |
| 5,955,154 A | 9/1999 | Xuan et al. ................ | 427/555 |
| 5,968,608 A | 10/1999 | Xuan et al. ................ | 427/555 |
| 6,013,336 A | 1/2000 | Baumgart et al. .......... | 427/555 |
| 6,048,589 A | 4/2000 | Suzuki et al. ............... | 427/554 |
| 6,108,169 A | 8/2000 | Liu et al. .................... | 360/135 |
| 6,118,632 A | * 9/2000 | Albrecht et al. ............ | 360/135 |
| 6,143,375 A | 11/2000 | Ross et al. .................. | 427/555 |
| 6,146,736 A | 11/2000 | Liu et al. .................... | 427/53.1 |

FOREIGN PATENT DOCUMENTS

JP      8-180351      7/1996

OTHER PUBLICATIONS

"Laser–induced deformation on hard disk surface", Appl. Surf. Sci., vol. 138–139, (1999) pp. 482–488.*

Wee Teng–Soon, "Laser Marking on Hard Disk Media", Insight, Jan./Feb. 1999, pp. 14,16 and 17.

Collection of documents including note to David Salamon, and attachments thereto.

U.S. Patent application Ser. No. 09/234,448, filed Jan. 20, 1999.

* cited by examiner

*Primary Examiner*—Paul Thibodeau
*Assistant Examiner*—Holly C. Rickman

(57) ABSTRACT

A method for marking the defective side of a magnetic disk comprises the step of applying a set of laser pulses to the defective side to form a mark that is visible to the naked eye. Thus, disk drive manufacturers can readily see whether one side of the disk is defective, and if so, which side of the disk is defective. Thus, the disk drive manufacturer can assemble a disk drive so as to use the functional side of the disk. The laser marks are formed on the disk without generating particulate contamination.

22 Claims, 4 Drawing Sheets

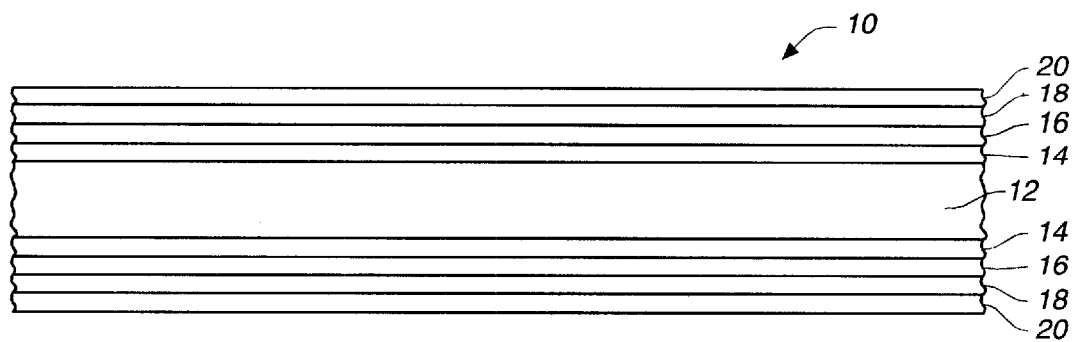
FIG._1
*(PRIOR ART)*
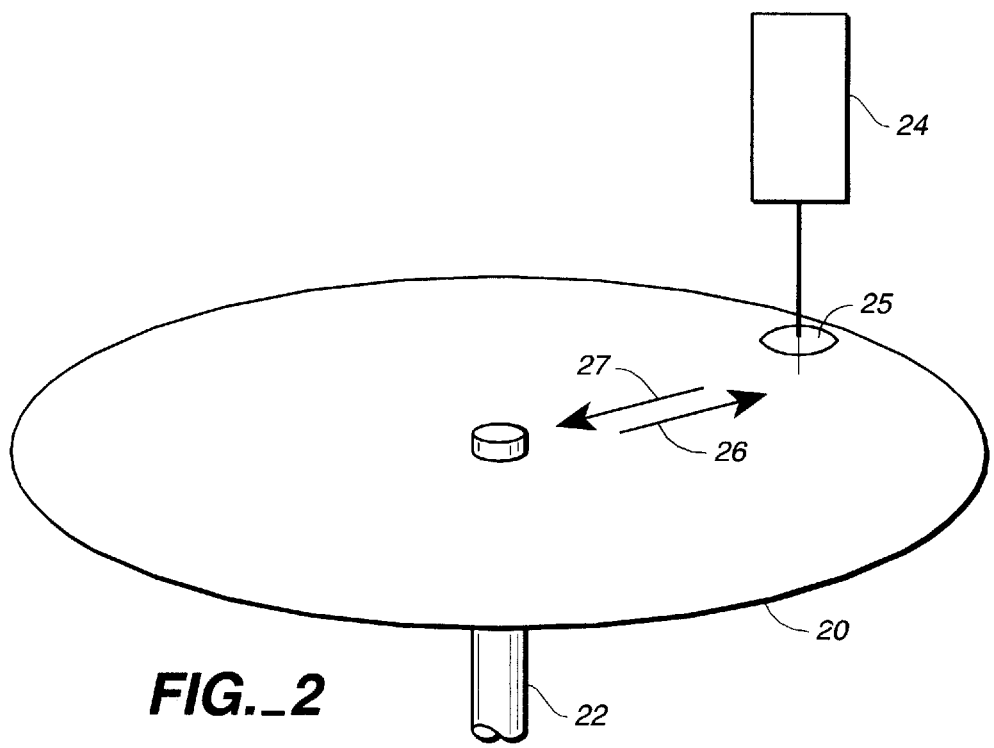
FIG._2
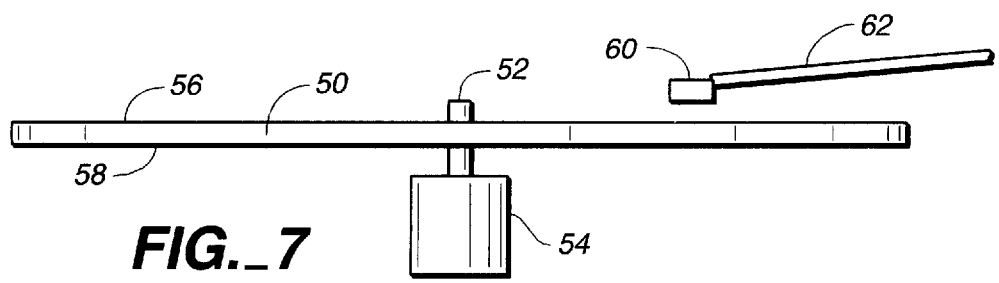
FIG._7

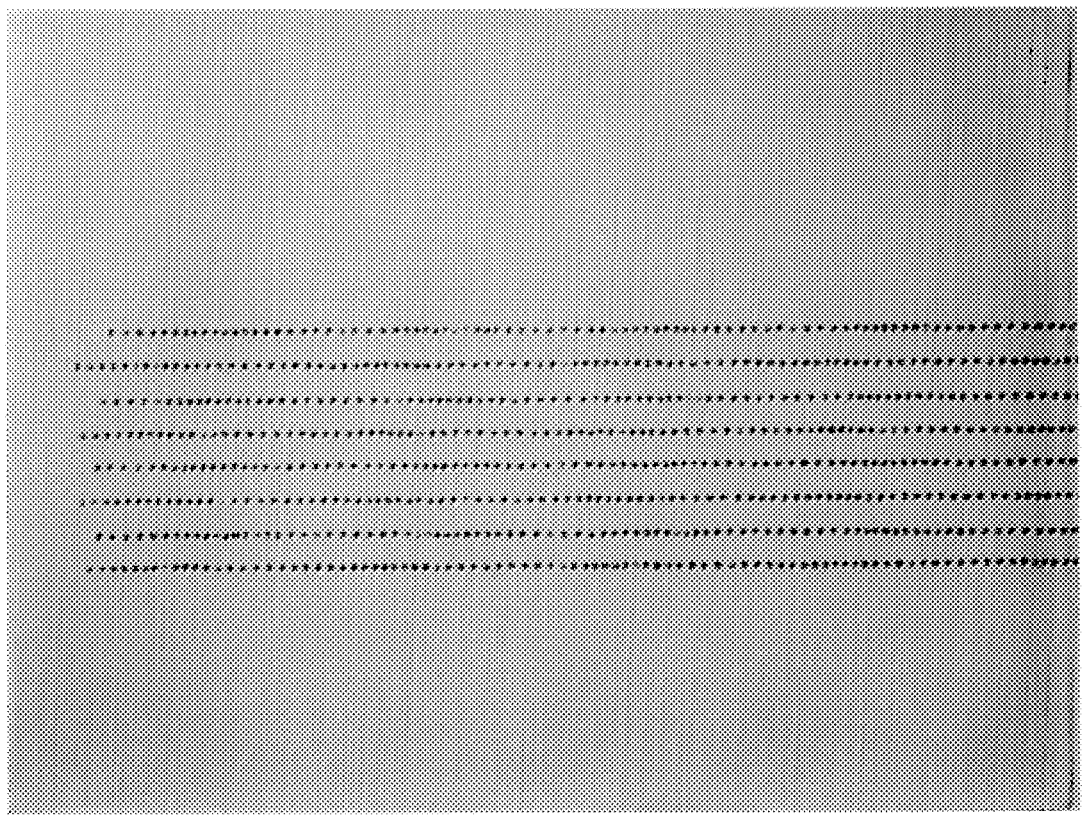
FIG._3
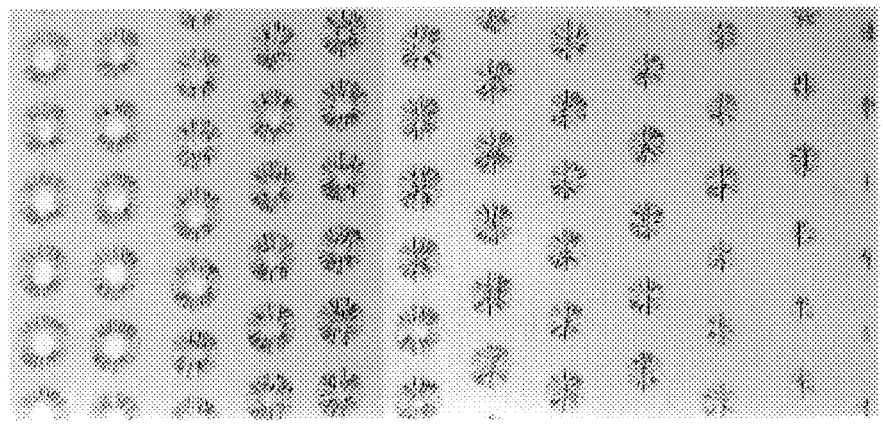
FIG._4

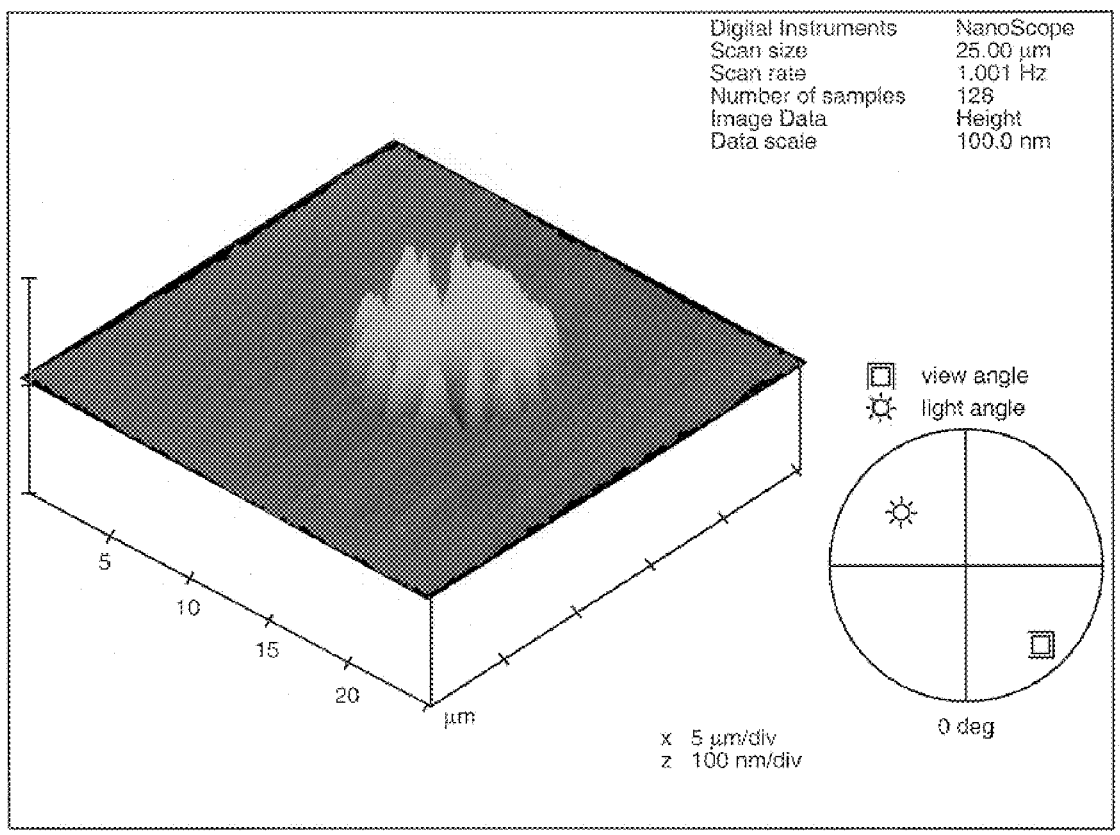
FIG._5

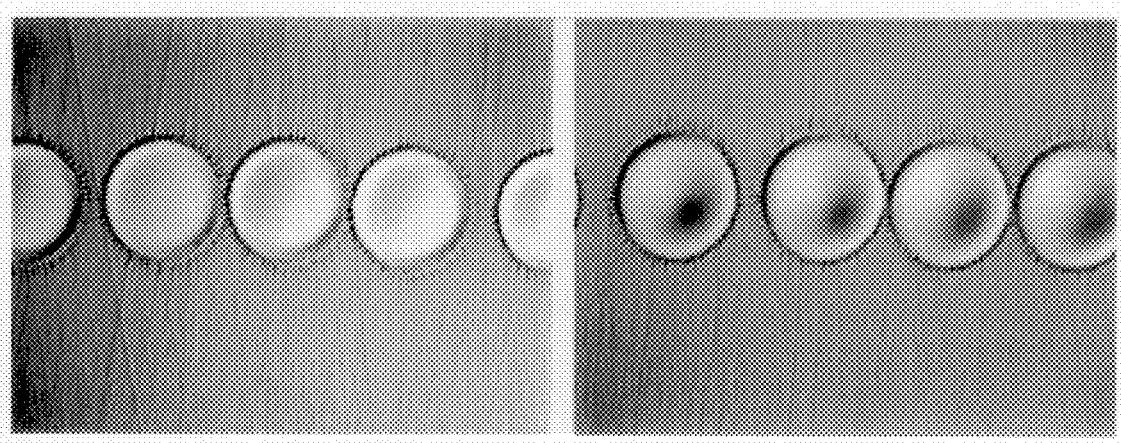
FIG._6

METHOD OF MARKING DISKS

BACKGROUND OF THE INVENTION

This invention pertains to methods of marking magnetic disks and the resulting disks.

Referring to FIG. 1, a typical magnetic disk 10 is manufactured by the following process.

1. Both sides of an aluminum alloy disk-shaped substrate 12 are coated, by electroless plating, with a NiP alloy layer 14.
2. The NiP alloy layer 14 is polished and textured.
3. An underlayer 16 (typically Cr, a Cr alloy, NiP, or other material) is sputtered onto NiP alloy layer 14.
4. A magnetic alloy layer 18 (typically a Co alloy) is sputtered onto underlayer 14.
5. A protective overcoat 20 (typically carbon or hydrogenated carbon) is sputtered onto magnetic alloy layer 18.
6. A lubricant layer is applied to protective overcoat 20.

Details concerning methods for manufacturing magnetic disks are described in U.S. patent application Ser. No. 08/984,753 now U.S. Pat. No. 6,150,015 filed by Bertero, et al. and incorporated herein by reference. (In lieu of NiP-coated aluminum alloy substrate 12, it is also known in the art to use a glass or glass ceramic substrate. In such processes, an underlayer, magnetic alloy and protective overcoat are typically deposited on the glass or glass ceramic substrate. A lubricant layer is then applied to the overcoat.)

As shown in FIG. 1, layers 14, 16, 18 and 20 are formed on both sides of substrate Occasionally, there is a defect on one side of disk 10 that renders that one side of the disk unusable while the other side of the disk is fully functional. There is a market for magnetic disks in which only one side is functional. However, after testing the disk, it is necessary to mark the defective side of the disk so that a disk drive manufacturer can tell which side should be used, and which side should not be used. In the past, a type of felt tip pen was used to mark the defective side of the magnetic disk.

Magnetic disks are made and tested in clean room environments, where elimination of dirt and other contaminants is of great importance. Accordingly, the felt tip pen is designed and used in a manner that minimizes such contamination. The pen is coupled to marking automation that receives a disk from a tester and marks the appropriate side of the disk. Unfortunately, the pen is prone to drying and running out of ink, and therefore, the disk must be inspected to ensure that the mark on the disk is visible.

It would be desirable to find an alternate means of marking the defective side of a disk. It is important that this method not create contaminants. In addition, this alternate means of marking the defective side of the disk must be reliable, fast and efficient.

SUMMARY

A method for marking a defective side of a magnetic disk comprises the step of applying laser pulses to the defective side. The laser pulse parameters are selected so as to form marks having a rippled or crinkled appearance on the magnetic disk. However, the laser power and pulse duration are not so great as to result in the formation of a crater in the magnetic disk. I believe that during this process, the lubricant layer is evaporated from the portions of the disk surface which receive the laser pulse. I also believe that the ripple formation process may result from delamination of the sputtered films from the substrate, or the deformation of the NiP layer under the sputtered films, or both.

During a method in accordance with one embodiment of the invention, several rows of such laser marks are formed. These rows of laser marks are visible to the naked eye. Thus, disk drive manufacturers can easily see which side of the disk is defective.

In accordance with another embodiment, the laser marks are arranged in patterns other than rows. These patterns of laser marks ate also visible to the naked eye.

A process in accordance with my invention can be used to mark different types of magnetic disks, e.g. disks using metallic substrates, glass substrates, glass ceramic substrates, or other materials. The process can be used to mark disks having different types of layers, e.g. Co based magnetic layers, Fe based magnetic layers, carbon protective overcoats, $ZrO_2$ protective overcoats, or different types of underlayers.

A marking process in accordance with some embodiments of the invention has one or more of the following advantages:

1. The laser marking process is reproducible.
2. The laser marking process is used to mark the defective side of magnetic disks without causing contamination.
3. Since a pen is not used, there is nothing that can dry out or run out of ink during use.
4. The laser marking process marks the defective side of the disk without affecting the functional side of the disk.
5. The laser marks are produced rapidly for enhanced manufacturing throughput.
6. The laser marks are readily visible to the naked eye. (This is important to the disk drive manufacturer, who must use the disk to assemble a working disk drive.)
7. The laser marking process can employ the types of lasers that are already in use in other areas of the disk manufacturing process. (Typically, lasers are used to texture magnetic disks prior to sputtering.)
8. The laser marking process can employ robotic manufacturing equipment to minimize the need, expense, and contamination problems that normally accompany human handling.

These and other advantages of the invention will be more readily apparent in light of the description below.

BRIEF DESCRIPTION OF THE DRAWINGS

FIG. 1 illustrates in cross section a portion of a magnetic disk constructed in accordance with the prior art.

FIG. 2 schematically illustrates equipment for using a laser to mark the defective side of a magnetic disk.

FIG. 3 shows a set of laser marks formed on a side of a magnetic disk in accordance with the invention.

FIG. 4 is photograph of a set of laser marks in which laser pulse power progressively increases.

FIG. 5 is an atomic force microscope photograph of a laser mark in accordance with my invention.

FIG. 6 illustrates laser marks formed using a laser having a relatively high power.

FIG. 7 illustrates a disk drive including a magnetic disk marked in accordance with my invention.

DETAILED DESCRIPTION

A method for marking the defective side of a magnetic disk comprises the step of applying laser pulses to the defective side of the magnetic disk. In one embodiment, the disk has a diameter of 95 mm, but other disk sizes can also be used. The disk itself can be of conventional construction, e.g. as shown in FIG. 1, described above. Methods of making and using such disks are well known in the art. Details concerning one such type of disk can be found in U.S. patent application Ser. No. 08/984,753 now U.S. Pat. No. 6,150,015.

Prior to marking, each side of the disk is tested for defects, e.g. magnetic defects or the presence of undesired asperities on the disk surface. In one embodiment, this testing is performed using device model MG250A, manufactured by Phase Metrics of Fremont, Calif. However, other kinds of testers can also be used. The tester typically performs glide and certification tests. Glide tests are performed to detect asperities on a magnetic disk. The glide test limits are typically in accordance with specifications provided by the disk drive manufacturer. Glide tests screen for the presence of one or more asperities having a certain height. In one embodiment, the height is between 0.5 and 1 $\mu$". Certification tests are designed to screen for magnetic defects, e.g. as specified by the disk drive manufacturer. Typical tests screen for magnetic defects that are "non-correctable", e.g. defects of a certain length (e.g. about 100 $\mu$m or greater) and a certain width (e.g. about 1 $\mu$m or greater). The tests performed during glide and certification testing are typically in accordance with manufacturer specifications. If one or more defects are detected on one side of the disk so as to render that one side of the disk unusable to the manufacturer in accordance with its specifications, one or more laser pulses is applied to the defective side of the disk. These pulses can be used to form marks arranged as, for example, one or more parallel lines on the defective side. In one embodiment, the pulses are arranged as eight parallel lines of pulses extending in a radial direction. In this embodiment, the lines of pulses start at a radius of 21 mm and end at a radius of 41 mm.

In one embodiment, the disk is marked with a laser such as model number V80-106Q, manufactured by SpectraPhysics Corporation of Mountain View, Calif. The laser wavelength is typically about 1064 nm, but other kinds of lasers and wavelengths can be used as well. Apparatus used to mark the disk can be as schematically illustrated in FIG. 2. Referring to FIG. 2, a disk 20 is held by a holding apparatus 22. A laser 24 and focusing lens 25 move back and forth, in the direction of arrow 26 and arrow 27, while laser pulses are used to mark disk 20. During this marking process, the disk is not moving.

FIG. 3 illustrates a disk laser marked in accordance with our invention. Each line of pulse marks is a distance of about 50 microns from the neighboring line of pulse marks. Within each line, the marks are spaced immediately next to each other. In one embodiment, each mark is 14 $\mu$m in diameter and has a height between 50 and 60 nm.

The number of lines formed on the disk represents a trade-off. If fewer lines are formed on the disk, one achieves greater throughput at the expense of reduced mark visibility. If one provides more lines on the disk, one achieves greater visibility at the expense of reduced throughput. In one embodiment, eight lines of marks are formed. However, in other embodiments of my invention, fewer or more than eight lines of marks are formed.

The size, shape and morphology of the laser marks depend upon the parameters one uses to form the marks. I have identified three types of process parameter regimes that can result from applying a laser pulse to a magnetic disk: a low power regime, a mid-power regime and a high power regime. In a preferred embodiment, I use a low power regime. Laser pulses within this regime provide laser marks on a disk with a unique appearance.

FIG. 4 illustrates set of laser marks formed by pulses of increasing laser pulse power. The marks in the seven columns of marks on the right side of FIG. 4 are formed with laser pulses within the low power regime. (I prefer the laser marks having the appearance of the fourth column from the right for reasons of good visibility.) As seen in FIG. 4, the laser marks have a wrinkled appearance. Also, for pulses formed within the low power regime, there is no central crater in the middle of the laser mark. The laser mark peaks are typically 20 to 60 nm in height. The highest point on the mark will be a peak from one of the wrinkles, so it is hard to control this height precisely. I believe that the wrinkled appearance is due to partial delamination of the sputtered layers from the substrate within the magnetic disk. It is also possible that these features are caused by deformation or melting of the NiP layer underneath the sputtered films. During this marking process, the lubricant layer on the portion of the disk that receives the laser pulse is evaporated. I believe the carbon overcoat at the mark is intact, since laser marking does not increase the disk's susceptibility to corrosion, even after several days of corrosion testing.

FIG. 5 is an atomic force microscope photograph of a mark formed with a pulse in the low power regime. FIG. 5 shows that the laser mark comprises a set of wrinkles, with no central crater.

In one embodiment, the laser pulses used to form the laser marks are 200 ns in duration, at a frequency of about 1 kHz. (In other embodiments, the pulse duration is between 120 ns and 200 ns and the frequency is between 1 kHz and 40 kHz.) The average power per pulse can be 400 mW for an energy of about 8 $\mu$j/pulse. I find it easier to make laser marks in the low power regime if the laser pulse is longer. (It should be noted that since disks are manufactured with different layer compositions, thicknesses and properties, parameter selection is somewhat empirical. It may be desirable to employ different laser pulse parameters to mark different types of disks.) During marking, the disk is typically moved at a speed of about 20 mm/second relative to the laser pulse to trace out a line of laser marks on the disk.

The left most five columns of laser marks in FIG. 4 are within the mid-power regime. These marks are characterized by a central crater surrounded by "fingers" having a wrinkled appearance. As mentioned above, I believe the wrinkled fingers indicate delamination of the sputtered layers from the NiP plating. I believe that the central crater is a region where the carbon overcoat has been destroyed and the sputtered metals mix with the NiP plated layer. The rim of the crater determines the height of the marks in this process regime, and they can reach 50 to 100 nm high. There are some minimal corrosion effects in the mid-power regime marks, but this problem is not severe.

FIG. 6 illustrates marks made at the high power regime. In this process parameter regime, the central crater grows and the wrinkled region shrinks. The marks in this regime have shapes strongly resembling those of ordinary laser texture ridge-type bumps, but they are typically higher, e.g. having heights between 100 and 200 nm. The marks are formed almost entirely of melted NiP, with some of the sputtered layer metals mixed therein. Corrosion effects are worse in the high power regime than in the mid-power regime, though not severe.

I have found that laser pulses in the mid and high power regimes can form contaminant particles. Particle generation appears to coincide with the formation of the central crater when the marks transition from the low to mid power regimes. The number of particles then steadily increases with power. The particles form a light "dusting" all around the marks, but they can extend outwardly of tens of microns at high power levels. These particles have been found to have diameters in the range of 10 to 100 nm, with some as large as I Am in the high power regime. It is for this reason that the low power regime is typically used.

A disk marked in accordance with my invention is typically incorporated into a disk drive. Such a disk drive is schematically illustrated in FIG. 7. Referring to FIG. 7, a disk 50 marked in accordance with my invention is mounted on a spindle 52 that is rotated by a motor 54. Disk 50 has a functional side 56 and a defective side 58. A read-write head 60 mounted on a suspension arm 62 is positioned over the disk so that data can be read from and written to functional side 56 of magnetic disk 50.

It is also known in the art to mount two or more disks within a disk drive. For example, it is known in the art to mount two disks on a spindle. Thus, in an alternative embodiment, a disk drive can include two or more magnetic disks, of which one or more disks are marked on one side.

Some disk drive manufacturers sell two versions of a disk drive in which the disk drive assembly is designed to accommodate two magnetic disks. One of the versions incorporates two fully functional disks, and one of the versions incorporates one fully functional disk. The drive motor and other mechanical portions of the drive are designed to be operated with a mechanical load comprising two magnetic disks. Thus, there is a demand for disks in which both sides are non-functional. Such disks are used to provide an added mechanical load for the disk drive so that it will function properly. Accordingly, a method in one embodiment of my invention is used to mark both sides of a magnetic disk. Such a disk can therefore be readily identified by a disk drive manufacturer, and provided in a disk drive that will therefore have one fully functional disk, and one non-functional disk which is provided for purposes of providing a desired mechanical load for the drive mechanism.

While the invention has been described with respect to specific embodiments, those skilled in the art will realize that changes can be made in form and detail without departing from the spirit and scope of the invention. For example, different types of lasers and laser pulse parameters can be used. Further, different materials can be used to form the various layers within the magnetic disk. In lieu of aluminum, glass or glass ceramic substrates can be used. In lieu of an underlayer such as Cr or NiP, other materials such as NiAl can be used. In lieu of a Co based magnetic alloy, a Fe based alloy can be used. Also, in lieu of a carbon overcoat, other protective overcoat materials can be used, e.g. $ZrO_2$.

While one embodiment of the invention is used to mark magnetic disks, the invention can also be used to mark magneto-optical disks or optical disks. (Such disks contain magneto-optic or optical layers on a substrate as a data recording layer.) Accordingly, all such changes come within the invention.

I claim:

1. A method for marking a data recording disk, said disk comprising a substrate, a data recording layer and a protective overcoat formed over said data recording layer, said method comprising the step of applying a set of laser pulses to said disk to thereby form a set of marks on a surface of said disk that are visible to the naked eye without burning through said protective overcoat.

2. Method of claim 1 wherein said disk is a magnetic disk and said protective overcoat is formed over a magnetic layer.

3. Method of claim 1 wherein said protective overcoat is a carbon overcoat that does not burn through during said step of applying.

4. Method of claim 1 wherein said step of applying is performed on one side of said disk.

5. Method of claim 1 wherein said step of applying is performed on both sides of said disk.

6. A method for marking a data recording disk, said disk comprising a substrate and a data recording layer, said method comprising applying a set of laser pulses to said disk to thereby form a set of marks on a surface of said disk that are visible, said method further comprising testing said data recording disk to determine whether it is defective, wherein said laser pulses are applied to a defective side of said disk after said testing.

7. Method of claim 6 wherein said disk comprises an underlayer on said substrate, said data recording layer being a magnetic layer disposed on said underlayer.

8. Method of claim 7 wherein said laser pulses form marks comprising a set of wrinkles on the surface of said disk.

9. Method of claim 8 wherein said disk comprises a protective overcoat and said laser pulses do not burn through the protective overcoat on said disk.

10. Method of claim 6 wherein said data recording disk is a magnetic disk and said data recording layer comprises a magnetic layer and a protective overcoat formed over said magnetic layer.

11. Method of claim 6 wherein said testing detects asperities on the surface of said disk.

12. Method of claim 6 wherein said testing detects magnetic defects in said disk.

13. A method for marking a data recording disk, said disk comprising a substrate and a data recording layer, said method comprising applying a set of laser pulses to said disk to thereby form a set of marks on a surface of said disk that are visible to the naked eye, wherein said laser pulses do not form a crater in said data recording disk.

14. A method for marking a data recording disk, said disk comprising a substrate and a data recording layer, said method comprising the step of applying a set of laser pulses to said disk to thereby form a set of marks on a surface of said disk that are visible wherein said laser pulses do not generate contaminants.

15. Method of claim 13 wherein said data recording disk is a magnetic disk.

16. Method of claim 14 wherein said data recording disk is a magnetic disk.

17. A method for marking a data recording disk, said disk comprising a substrate, a data recording layer, a protective overcoat formed over said data recording layer, and a lubricant applied to said protective overcoat, said method comprising the step of applying a set of laser pulses to said disk to thereby form a set of marks on a surface of said disk that are visible to the naked eye.

18. Method of claim 17 wherein said disk further comprises an underlayer formed between said substrate and said data recording layer.

19. A method for marking a data recording disk, said disk comprising a substrate and a data recording layer, said method comprising applying a set of laser pulses to said disk so thereby form a set of marks on a surface of said disk that are visible, said method further comprising testing said data recording disk, said marks indicating results of said test.

20. Method of claim 19 wherein said marks are visible to the naked eye.

21. Method of claim 19 wherein said disk is a magnetic disk.

22. Method of claim 19 wherein said testing detects defects in said data recording disk.

* * * * *